(12) United States Patent     (10) Patent No.:    US 8,865,056 B2
Fagan                                                 (45) Date of Patent:     Oct. 21, 2014

(54) BEVEL HEAD FOR CONTROLLING A CUTTING TORCH TO CUT PLATE WITH WELD PREPARATION

(76) Inventor: Matthew Fagan, Middle Park (AU)

( * ) Notice: Subject to any disclaimer, the term of this patent is extended or adjusted under 35 U.S.C. 154(b) by 316 days.

(21) Appl. No.: 13/427,513

(22) Filed: Mar. 22, 2012

(65) Prior Publication Data

US 2012/0242015 A1    Sep. 27, 2012

Related U.S. Application Data

(60) Provisional application No. 61/466,392, filed on Mar. 22, 2011.

(51) Int. Cl.
*B23K 7/10*         (2006.01)
*B23K 37/02*       (2006.01)

(52) U.S. Cl.
CPC .................................. *B23K 37/0288* (2013.01)
USPC ............................................. 266/54; 266/59

(58) Field of Classification Search
CPC ........... B23K 37/0288; B23K 37/0282; B23K 37/0258
USPC ............................................. 266/48, 54, 59
See application file for complete search history.

(56) References Cited

U.S. PATENT DOCUMENTS

| 2,726,615 | A |   | 12/1955 | Downing |
| 3,451,666 | A | * | 6/1969 | Evans .............................. 266/54 |
| 4,933,531 | A |   | 6/1990 | Ichikawa et al. |
| 2012/0242015 | A1 | * | 9/2012 | Fagan .............................. 266/59 |

FOREIGN PATENT DOCUMENTS

GB           191309699 A      0/1914

OTHER PUBLICATIONS

International Search Report and Written Opinion in related PCT Application PCT/IB2012/000659, Aug. 3, 2013, 8 pages.

* cited by examiner

*Primary Examiner* — Scott Kastler
(74) *Attorney, Agent, or Firm* — Lathrop & Gage LLP

(57) ABSTRACT

A bevel head apparatus includes tilt, rotation, and vertical positioning with a cutting torch of a numerically controlled plate cutting machine. The apparatus has a back panel that attaches to the cutting machine and provides vertical movement of the cutting torch, a drive box coupled with the back panel houses electronics and mechanical components, an arm coupled to the drive box provides rotational movement of the cutting torch, and a pantograph coupled with the arm provides tilt movement to the cutting torch attached to the pantograph. Tilt, rotation, and vertical positioning of the cutting torch is controlled by the electronics and mechanical components. The bevel head apparatus also include a laser for measuring distance to determine and control a height of the cutting torch above the flat plate.

27 Claims, 10 Drawing Sheets

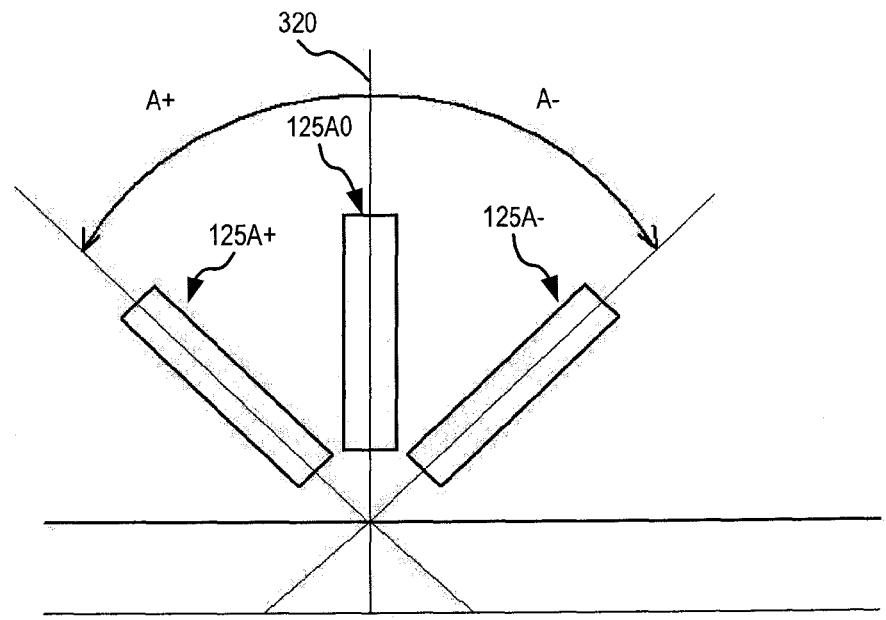
FIG. 3 - PRIOR ART
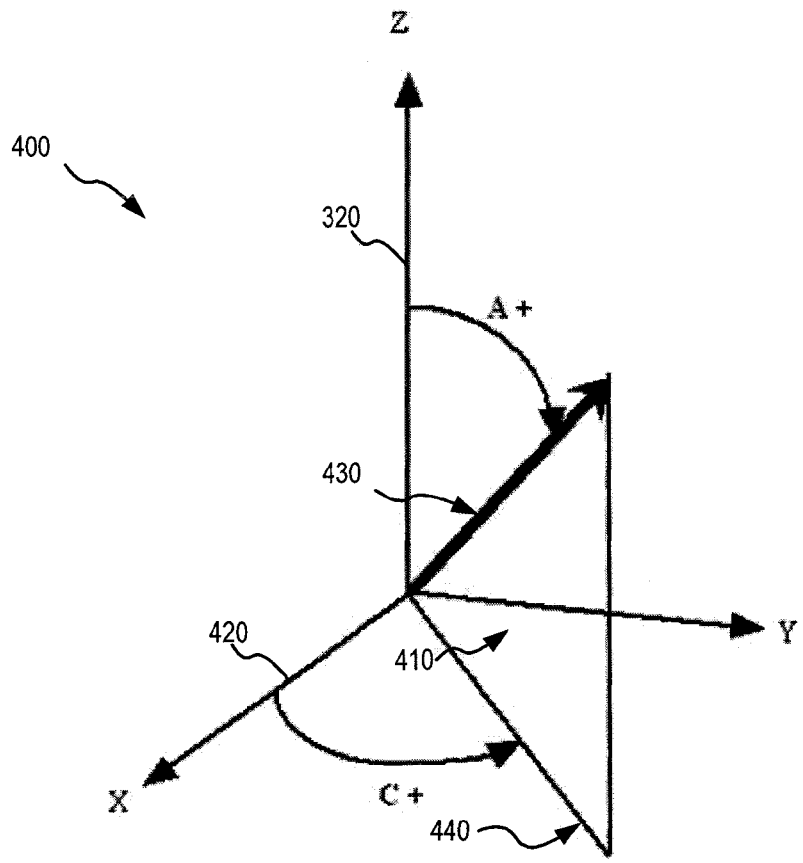
FIG. 4 - PRIOR ART

BEVEL HEAD FOR CONTROLLING A CUTTING TORCH TO CUT PLATE WITH WELD PREPARATION

RELATED APPLICATIONS

This application claims priority to U.S. Provisional Application Ser. No. 61/466,392 (hereinafter "'392 provisional"), filed 22 Mar. 2011, incorporated herein by reference.

FIELD OF THE INVENTION

The present application relates to the field of plate cutting, and more particularly, to plate cutting machines, such as those using plasma torches and the like, for the purpose of weld preparation on parts cut from plate.

BACKGROUND

The term "plate" is used herein to refer generally to a flat sheet of metal with a substantially constant thickness, usually greater than 6 mm or one quarter inch. Plates can be joined by bolting and/or welding. Joining by welding often requires preparation prior to welding, called weld preparation. Weld preparation typically includes creating sloped, largely straight faces on the plate edges. This is historically performed after a cutting operation in a separate, manual or semi-manual grinding process, which typically includes a great amount of additional handling, delay, labor, and cost.

FIG. 1 shows a conventional straight cutting NC machine 100 that includes a controller 150, which drives a vertical plasma torch 125 for cutting individual parts from a plate 160 that rests on a flame cutting bed 140 supported by steel slats. Typically, a nest of multiple parts are cut from plate 160 in one operation. A torch lifter 130 moves plasma torch 125 only along a vertical axis. Gantry 135 moves plasma torch 125 in an X-Y plane. Machines, similar to NC machine 100, have been used for plasma torch weld preparation, but these machines are expensive, inaccurate and difficult to program. Conventionally, these machines perform weld preparation as a separate process from part cutting, thereby suffering from many of the problems experienced with manual or semi-manual weld preparation described above. Interaction between a bevel head, a cutting machine, a plate to be cut, a plasma torch, the gantry, and the torch lifter are all controlled by the NC controller 150, which coordinates and controls motion in all axes. Conventional NC controllers include a torch height control that is voltage driven, requiring separate electronics and a separate lifting device (e.g., lifter 130).

Typical weld preparations are V, Y, X, K, J, and U preparations, where such letter characters illustratively represent the shape of the weld preparation. J and U preparations are used for very thick plates. X and K preparations, also called "double-V," are more common, since the cross-sectional area of such preparations are half of that required for a V preparation.

FIG. 2 illustrates a conventional weld preparation diagram useful for V, Y, X, and K preparations. The illustrated weld preparation can be made by one to three straight cuts with a plasma torch held at an angle. A supporting face 202 of a first part is welded to a weld face 201 (also known as a root face) of a second part that has been manually or semi-manually ground back to form grooves A1 and A3. Grooves A1 and A3 are formed at an angle to allow access to weld face 201. To allow for weld material between weld face 201 and supporting face 202, a root gap G is required. First, root gap G is welded, and then grooves A1 and A3 are welded. Failure to include the root gap in the part dimensions can result in an unusable part after the part is cut. The angle of root face 201 is known as the dihedral angle D. The dihedral angle D is determined by the relative angle of, for example, surface 210 and 201, irrespective of the type of weld face eventually created. The root face is also known as the "land," and parameters Z3 (depth to the top of the land from surface 210), Z1 (thickness of the plate), Z2 (depth of the bottom of the land from surface 210), and R1 (height of the bottom of the land as measured from the bottom surface 220) are also shown.

Some parts require additional processing prior to welding, for example by pressing and/or rolling into a bent shape such as a pipe end. In such a situation dihedral D and grooves A1, A3 may vary continuously relative to the flat plate being cut. This type of continuously varying cut is referred to as a Varying Bevel Angle or VBA. To produce a VBA on a part that is cut from a flat plate requires the torch to be capable of both swivel and tilt, as described using a C-axis and an A-axis, respectively. FIG. 3 shows a tilt axis (A-axis) 320 with three torches 125A+, 125A−, 125A0, positioned at tilt angles equal to A+, A− and A0, respectively. FIG. 4 shows a three dimensional Cartesian co-ordinate system 400. In FIG. 4 tilt axis (A-axis) 320 is overlaid onto the Z-axis such that a tilt angle of A+ is measured from the vertical Z-axis. Tilt axis 320 of FIG. 4 defines a first canonical axis. FIG. 4 also shows the plane of the tilt 410 and the swivel as described by C+ measured from the C-axis, or swivel axis 420. Plane of the tilt 410 measured by angle 'A' from tilt axis 320 is a plane bounded by a main vector 430 and its projection 440 onto the XY plane. It is shown as the vertical right triangle in FIG. 4. The C-axis 420 is a second canonical axis, which in FIG. 4 is overlaid onto the X-axis.

FIG. 4 shows the A- and C-axes conventionally used in a tilt and spin system for an oxyacetylene cutter, which do not suffer from cable wrapping. However, oxyacetylene cutter systems are not functional in plasma cutter environments, which do suffer from cable wrap. One example of a plasma cutter system cut that causes cable wrap is a looping corner cut. A looping corner cut may wrap cables by 270 degrees, at which point the plasma cutter rotation must be stopped before continuing a cut.

One conventional oxyacetylene NC machine uses a three torch cutting tool to simultaneously cut up to three faces at a time, making possible V, Y, X, and K shaped cuts on the edge of a plate. However, by using three torches, additional machinery and a separate control for each torch are required. Thus, the triple-torch system adds significant weight and financial cost. Additionally, to avoid torch flame collision, the lead torch, center torch, and trailing torch have to be significantly offset from one another (typically, by at least 20 mm). Also, with all three torches cutting simultaneously, this arrangement limits internal and external corner cutting capability. Moreover, cutting a part with weld preparation from the middle of a plate requires first cutting a rectangular hole in the plate so that each of the three torches can be edge started in turn, thereby resulting in significant waste of plate material to make the additional holes.

Another type of plasma cutting tool is a plasma arc welder, which is powerful and fast, but leaves a bevel of no more than a 45-degree chamfer on the plate edge. One advantage of this type of plasma cutting over oxyacetylene cutting is that the plasma torch can melt material at 10,000 degrees in a focused stream. In comparison, oxyacetylene uses a combusting process that heats the plate being cut substantially, which makes multiple passes more difficult. In comparison, a plasma torch is faster, especially when cutting thinner materials. In addition, the heat transferred from the plasma torch to the cut part is far less as compared to an oxyacetylene cutting process, thereby reducing unavoidable movement produced by thermal expansion.

Most existing bevel head designs are subject to problems with cable twists when the bevel head swivels. Swiveling designs also cannot travel any great distance while maneuvering around corners before cables and hoses become twisted. This is problematic since the cables carry high voltage, high current, and hoses contain various explosive gases and cooling water. Even when this conventional cable twist is minimized, the continual twisting cause material fatigue within the cable sand hoses, which reduces the service life of both the cable and its sheathing, resulting in higher repair cost and increased machine down time.

Additionally, attempts to reduce the overall weight of the bevel head and the machine have also resulted in an undesirable loss of structural strength for the resulting machine. Loss of structural strength leads to additional difficulties in managing bending, oscillation, natural harmonics, fracture stress points, distortion, and bearing loads. Bending and vibration are of particular concern with conventional pantograph designs. Weight is a major design consideration when fitting a bevel head onto an existing machine as an upgrade. Many currently available bevel heads are too large and too heavy; for example, the ESAB VBA head weighs one ton. Even recent, light weight heads weigh over 100 kg, plus the weight of substantial bulky cables for connecting the bevel head to remote amplifiers.

Conventional pantograph mechanisms allow manufacture with lighter materials and reduce the problems associated with cable twist, but these conventional pantographs cannot work in a smooth, controlled, accurate, and predictable way when coupled to a servo feedback system. Thus, conventional pantographs have compatibility issues with servo control systems, particularly when the torch used is positioned at, or close to, vertical. That is, conventional pantographs perform feedback directly on the A-axis and the C-axis, which causes instabilities. One example of this is the instability caused by a vertical torch position (A=0) resulting in the C-axis value being indefinite.

Controlling the height of conventional torches, especially when the torch cuts at an angle, has been another problem in the prior art. A torch held at 45 degrees with a 1 mm error in torch height, for example, can results in a 1 mm error in the cut path. Where a profile is created by multiple passes, the combined path error from the height error can add up resulting in an unusable part. Furthermore, the extreme environment near the point of cutting prevents the use of most known height control techniques. Arc voltage is conventionally used to predict torch height for plasma cutting, but conventional arc voltage height controls on plasma have, at best, a +/−2 mm accuracy. This accuracy problem is exacerbated when material is removal in multiple passes, for example, creating multiple faces in multiple passes. Conventional devices therefore use separate electronics and controls for the Z axis, which adds substantially to the cost to and weight of the system.

In addition to the height limitations discussed above, conventional cutting devices are also limited in the angle at which the torch can be tilted during a cutting operation. Although some conventional high definition plasma torches can cut at up to a 55 degree angle in some directions, conventional torch holders are incapable of tilting the cutting torch towards the pantograph at an angle greater than 45 degrees. A problem with the 45 degree angle limitation can be seen with respect to FIG. 11. FIG. 11 illustrates the difficulty encountered when cutting a bevel around a sharp corner. Path 1102 represents the top of the plate and 1103 the bottom of the plate. Vectors 1110, 1112 represent the torch vector at 45 degrees to the vertical while preparing the sloped faces 1100, 1101. The objective is to reach sloped face 1101 so that faces 1100, 1101 remain at constant angle and join at vector 1111. The torch, therefore, when reaching point 1120 has to remain stationary in the XY plane while the azimuth (C) changes smoothly and the tilt (A) increases until the vector at 1111 is achieved. This process cannot be accomplished by a torch limited to a 45 degree tilt, and such weld preparations thus have to be performed manually.

Another difficulty in creating corner cuts is shown in FIG. 12. Conventional devices must maintain a constant tilt angle to create a sharp corner. As shown in FIG. 12, a cutting torch moves along a cut path 1212 past a corner 1205, but then the torch must be turned 270 degrees in a looping path 1202 to approach corner 1205 again, in order to create the corner for a part without changing the torch tilt angle. Turning the torch in looping path 1202, however, requires the torch to cut into a waste portion of the plate, thereby increasing the amount of waste material and material cost for each cut part. Other conventional techniques to create corners (i.e., corner 1206 of path 1214 or corner 1204 of path 1210) at constant bevel angles include the reverse loop (1203) and the triangular corner (1201), but these alternative techniques still result in similar waste issues as seen with the use of looping path 1202.

SUMMARY OF THE INVENTION

Accordingly, an objective of the present application is to create a cutting machine having a torch tilt to at least 60 degrees. It is another object of the present application that axes XY and AC are independent, but able to move synchronously together under program control.

In an embodiment, a bevel head apparatus for adding tilt, rotation, and vertical positioning to a cutting torch of a numerically controlled flat plate cutting machine includes a back panel attaching to the cutting machine and a drive coupled with the back panel for housing electronics and mechanical components, the drive box having vertical movement relative to the back panel. An arm coupled to the drive box provides rotational movement of the cutting torch, and a pantograph coupled with the arm provides tilt movement to the cutting torch attached to the pantograph. The tilt, rotation, and vertical positioning of the cutting torch are controlled by the electronics and mechanical components.

In an embodiment, a bevel head system has controls for controlling a tilt, a rotation, and a vertical movement of the bevel head, and includes a drive box having electronics, a tilt motor, a rotation motor, and a vertical motor for controlling the tilt, rotation, and vertical movement, respectively, a pantograph supporting a torch holder, an arm supporting the pantograph, and connected to the rotation motor, a gearbox, disposed with the arm and connected to a tilt motor driven central shaft recessed with the arm, for converting the rotational movement of the central shaft to the tilt movement of the pantograph, and a vertical movement controller having a drive screw connected to the vertical motor.

BRIEF DESCRIPTION OF THE FIGURES

FIG. 3 shows a torch tilt or A axis.

FIG. 4 shows a view of C axis, or azimuth axis, seen looking toward a plate, and with respect to other axes.

DETAILED DESCRIPTION OF THE FIGURES

Figure 5:
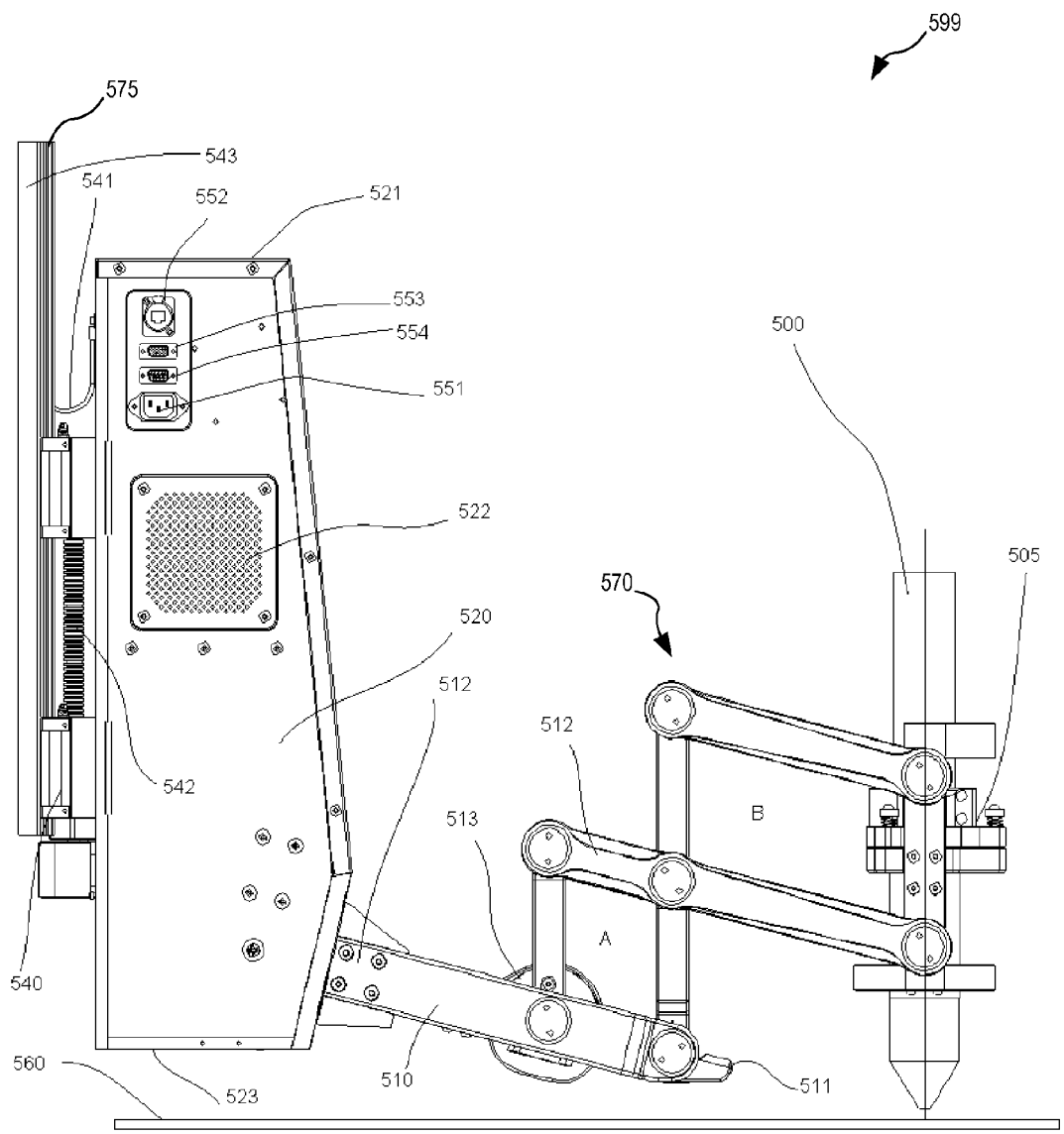
FIG. 5 shows a modular digital pantograph torch holder that addresses torch tilt A and azimuth C with a combination of a central twist axis U and pantograph tilt axis V, in an embodiment.
Figure 6:
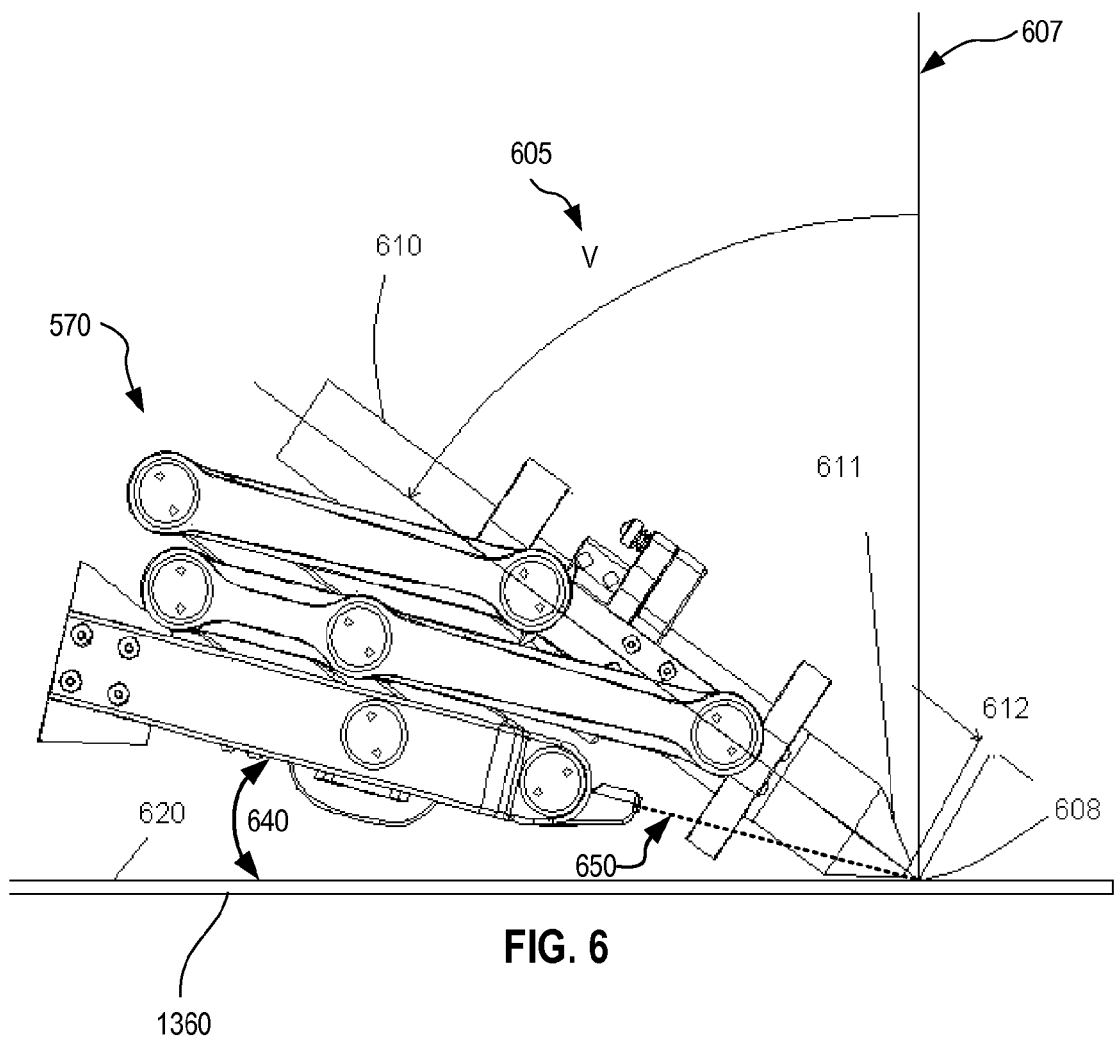
FIG. 6 shows a detail of the primary arm and pantograph of FIG. 5 with the cutting torch at a tilt of 55 degrees (V) from vertical.
Figure 7:
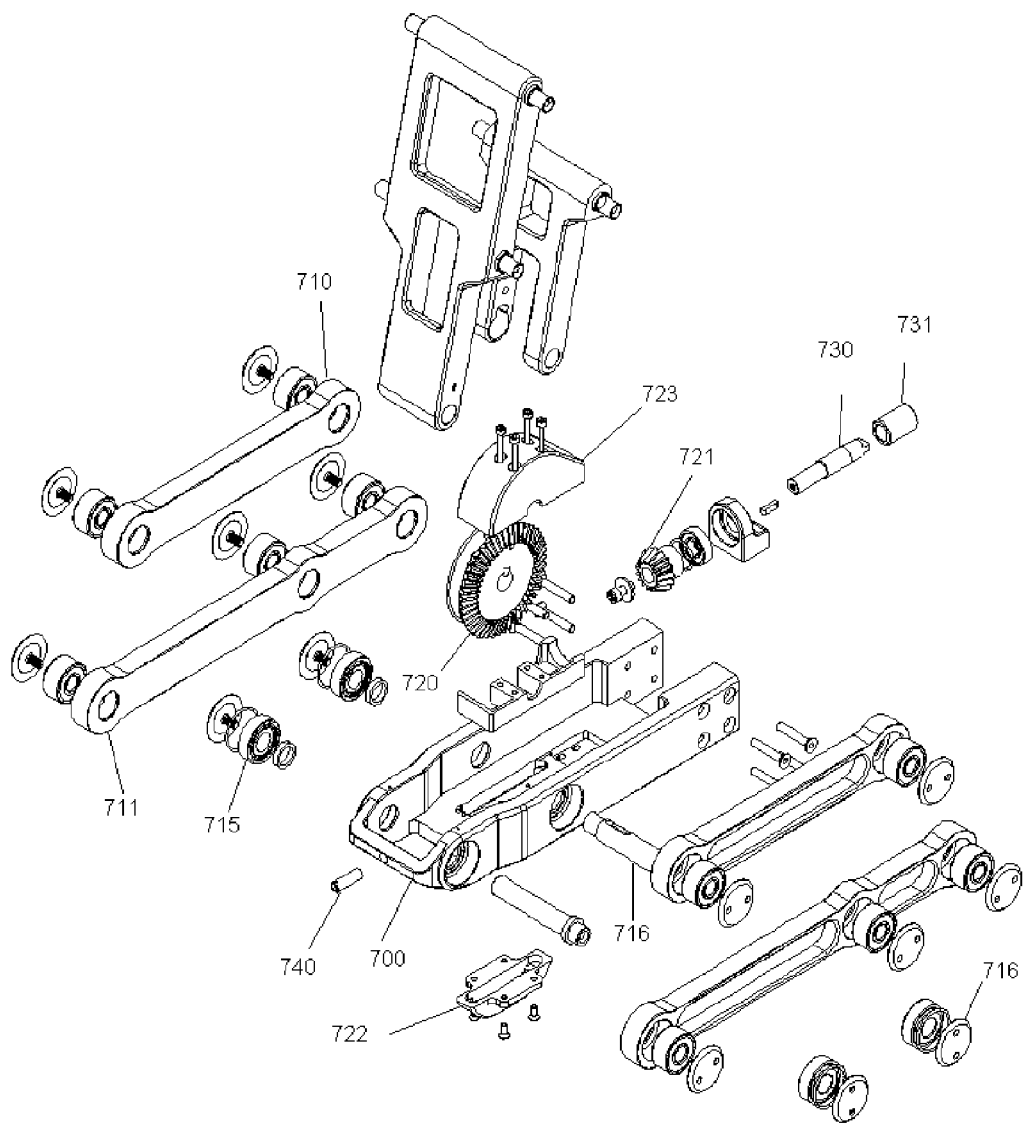
FIG. 7 shows an exploded view of the primary arm and pantograph assembly of FIG. 5.
Figure 8:
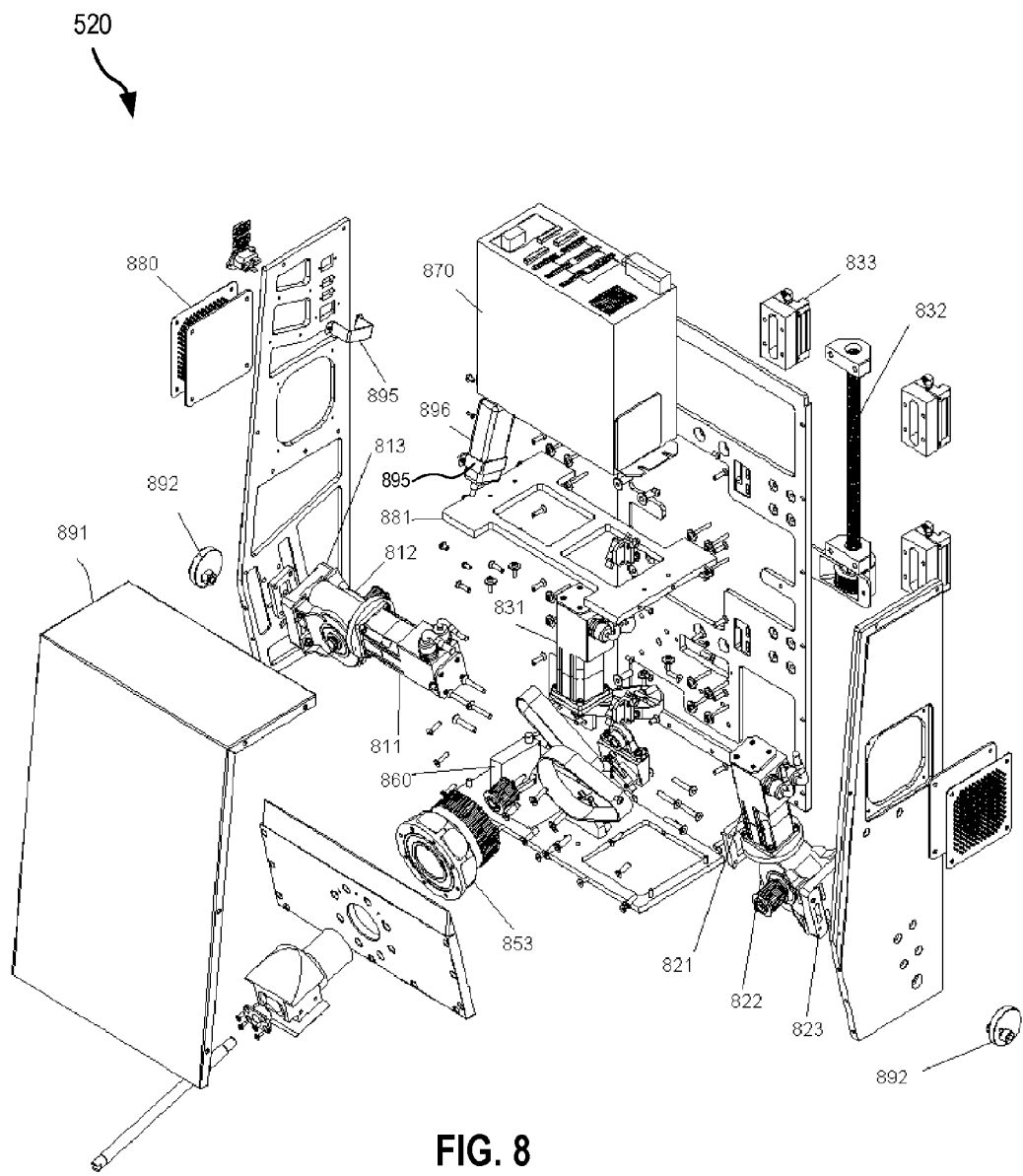
FIG. 8 shows an exploded view of the drive box of FIG. 5 showing three motors and an integrated self lifting Z axis.

FIG. 5 shows a side view of one exemplary bevel head 599 for controlling a cutting torch 500. FIG. 6 shows one example of a primary arm 510 and a pantograph 570 of FIG. 5, with the cutting torch at a tilt 605 of V=55 degrees from vertical axis 607. FIG. 7 shows an exploded view of primary arm 510 and pantograph assembly 570 of FIG. 5. FIG. 8 shows an exploded view of the drive box 520 of FIG. 5, showing three motors 811, 821, 831 and integrated self-lifting Z axis. FIGS. 5, 6, 7, and 8 can be viewed together, and with respect to the embodiment shown in FIG. 13, according to the following description.

As best seen in FIG. 5, the primary arm 510 is mounted to the drive box 520 such that primary arm 510 may rotate about an axis (hereinafter the "U" axis) that can be parallel and concentric with the length of primary arm 510. Primary arm 510 supports the pantograph 570, and is formed with two diagonally-opposite parallelograms A and B, which in turn support a breakaway mechanism 505 that carries the cutting torch 500. Forward and backward motion of pantograph 570 thereby can control the tilt 605 (FIG. 6) from the tilt axis 607 (also called the vertical axis or "V" axis) of cutting torch 500. The forward and backward pantograph tilt 605 is actuated by a drive shaft 730 (best seen in FIG. 7) through the center of primary arm 510.

Within drive box 520, amplifier 870 provides power to drive the servo motors 811, 821, 831 (best seen in FIG. 8), thereby eliminating the large, expensive, fragile, and bulky cables and plugs conventionally required where amplifiers are distanced from the servos.

Breakaway mechanism 505 functions to unseat a torch holder and break an electrical circuit to immediately stop a cutting machine (e.g., cutting machine 1300 of FIG. 13) if an impact to cutting torch 500 occurs from a sideward direction or from beneath.

Parallelograms A and B of pantograph 570 can be arranged in an opposing manner to provide a balance between an overall length, weight, and strength of the pantograph, and also with an ability to fold the pantograph up to an angle of near 60 degrees (e.g., 58.5 degrees) during a cutting operation, as shown in FIG. 6. Each arm of pantograph 570 may also include surfaces that are curved, rather than flat with holes drilled for their axles, to facilitate the folding process. The arms of pantograph 570 can be milled in 5 axes from rectangular bar stock. Primary arm 510 (also shown as primary arm 700 of FIG. 7) may also have a "U" shape to add strength without adding excess weight.

According to an embodiment, bevel head 599 need not rotate in the X-Y plane (i.e., it can remain facing the same direction while cutting), and therefore a required cutting torch tilt and angle (A-C) is translated into U axis rotation of primary arm 510, and V axis movement of pantograph 570.

Within primary arm 510, a gearbox 513 may contain a spur gear 720 and a pinion 721 that cooperate with drive shaft 730. Thus, one plane of gearbox 513 can be fixed vertically within primary arm 510, and also project both below and above arm 510. Gearbox 513 can further be sealed by two milled covers 722, 723 that protect moving components from particulate matter. Rotary motion of drive shaft 730, as discussed above, can then be converted to forward and backward motion of pantograph 570 within gearbox 513. Bearing 715 can further support pantograph 570, and may be sealed and closed by covers 716. Accordingly, bevel head 599 can be so arranged according to an embodiment such that the only exposed thread, gear, or bearing would be the rear drive screw 542 (element 832 in FIG. 8), which is effectively shielded, vertically situated, and spaced away from the cutting torch. Nevertheless, one of ordinary skill in the art, after reading and comprehending the present application, can include a cover, or sliding cover, over the screw 542 without departing from the scope of the system described herein.

In an embodiment, gearbox 513 may introduce at least a 1:3 coupling ratio between control of V axis movement and U axis movement. The coupling ratio may then be factored into control software (e.g., software 1354 of PC 1350, FIG. 13) that controls the bevel head 599. The mechanical coupling between gearbox 513 and primary arm 510 will cause drive shaft 730 to also rotate (at a same 1:3 ratio in this example) to prevent unwanted change in the V axis. The use of gearbox 513 and geared couplings between servo motors and associated drive shafts of the U and V axes thus provides resistance to motion of pantograph 570 from external forces, particularly when power to the machine may be inadvertently removed. Therefore, bevel head 599 advantageously does not require additional braking mechanisms to prevent such unwanted movement.

In an embodiment, primary arm 510 may be detached from the drive box 520 at point 512 to facilitate packing, shipping, service, assembly, shipping costs, etc., when carried separately. The folding ability of the pantograph 570, as best seen in FIG. 6, also facilitates packing and transport of the machine, whether as a single unit, or in separate components. Drive shaft 730, recessed within arm 510, can further be split, joined with a tongue and groove method, and secured by a ferrule 731. Wiring between the components (not shown) may also be separable such that pantograph 570 may be detached fully at point 512 (by removing 8 screws in this example). Electrical connections (e.g., for laser 511 and/or breakaway mechanism 505) may also or alternatively include plugs and sockets near point 512.

As shown in FIG. 5, drive box 520 can be formed, for example, as a Faraday cage to prevent electrical interference from cutting torch 500 (e.g., where cutting torch 500 is a plasma cutting torch that forms an arc), and/or from other nearby radio frequency sources. Drive box 520 can be milled from solid aluminum and assembled with screws to produce a strong exoskeleton to protect internal components from mechanical vibration and the up to 10,000° C. temperatures often associated with cutting torches. In an embodiment, external wiring to laser 511 and breakaway mechanism 505 are also coated with high temperature resistant silicon. Drive box 520, including front panel 521, 891, can provide rigid support to primary arm 510 (and thus pantograph 570), allowing arm 510 to be formed as a long cantilevered arm that is not affected by vibration or unintended movement, particularly at full extension, and/or while in motion.

Front panel 521, 891 may be removable for easy access to the electronics, motors and gearboxes within drive box 520, and may be made of stainless steel. A temperature activated fan 880 may be installed behind a perforated stainless grill and filter 522 to provide cooling for components (e.g., servo motors 811, 821, 831 and amplifier 870) within drive box 520.

Figure 13:
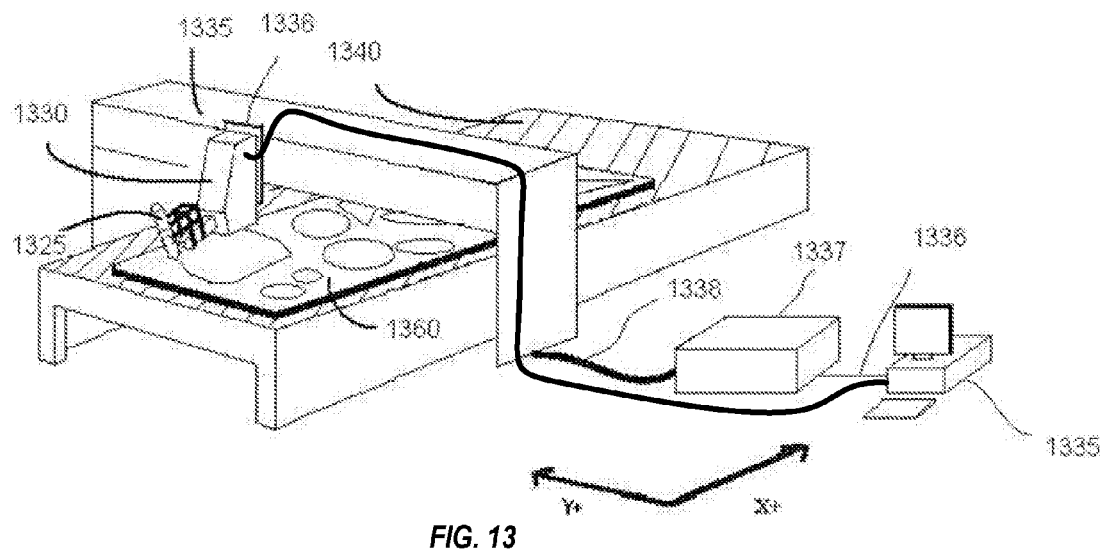
FIG. 13 shows an NC plasma machine integrated with a bevel head.

Drive box 520 may include a standard plug 551 to receive domestic power (e.g., 240 volt) and an RJ45 socket 552 for communication with PC 1350 (see FIG. 13). Drive box 520 may also include RS232 plugs (553, 554) to provide additional outputs from laser 511, which may be, for example, a digital laser, and a multiplexed I/O that passes encoded values of limit switches, breakaway mechanism 505, and control of laser 511 that may be located in the tip of pantograph 570.

Laser 511 may be aligned with the central axis of the pantograph 570, that is, both at an angle 640 from the horizontal, and should indicate 650 a precise point 608 about which tilt and rotation occur, and the laser 511 may also be used for confirming that the geometry of pantograph 570 is correct. For tilt and rotation to occur about point 608, box 520 may be positioned at a precise fixed distance above plate 560.

Figure 1:
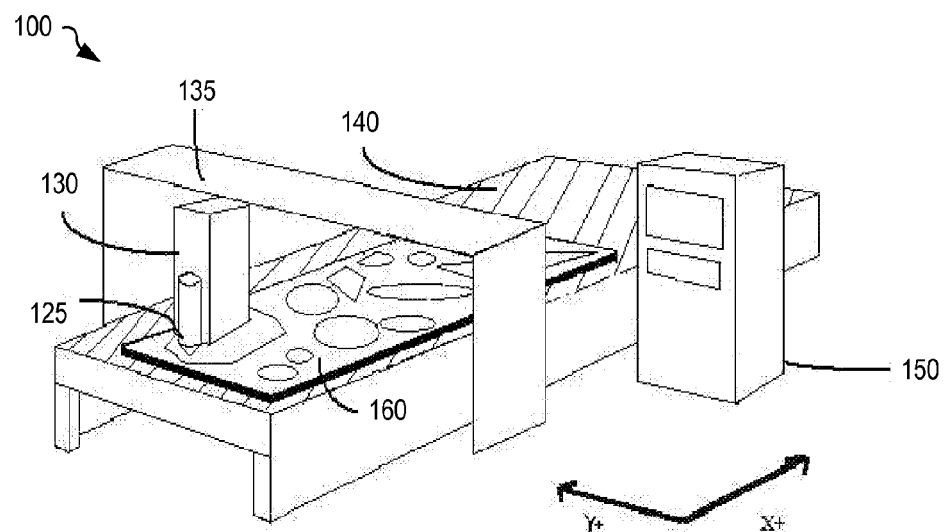
FIG. 1 shows a conventional XY axis NC plasma machine for plate cutting with a single vertical torch.
Figure 2:
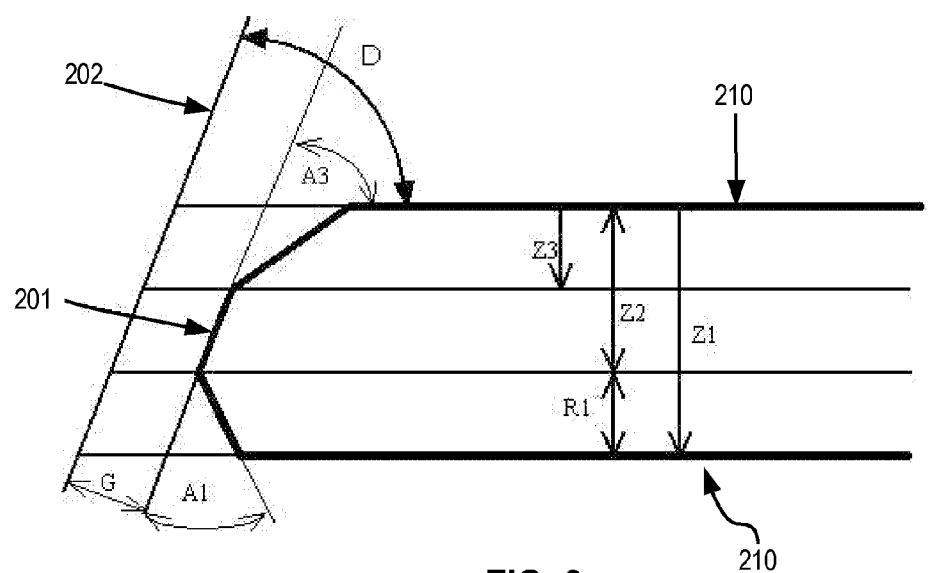
FIG. 2 shows a general example of weld preparation requirements.

FIG. 13 shows an example of bevel head device 599 in use with a plate cutting machine 1300, which together may add weld preparation when cutting parts from a plate 1360, which rests on flame cutting bed 1340. Bevel head 599 may be added to a conventional vertical X-Y cutting machine (e.g., cutting machine 100, FIG. 1) to form cutting machine 1300 with five axis control (i.e., axes X, Y, Z, A, and C) of a cutting torch 1325. By adding weld preparation when cutting the part from plate 1360, double handling, delays, and labor requirements for that part are reduced with little additional expense.

Cutting torch 1325 of FIG. 13 can be the same as cutting torch 500 of FIG. 5. Cutting torch 500 may be a plasma torch having a 2 inch diameter barrel. In an embodiment, bevel head 599 may be milled from aircraft grade aluminum, thereby combining strength, low weight, stability, low cost, and rigidity, while still providing a tilt angle close to 60 degrees for cutting torch 500, as described above.

A conversion module 1356 within software 1354 of PC 1350 converts A-C coordinates, which may be defined within an NC control program of the PC 1350, into U-V coordinates for controlling movement of bevel head 599. Position sensors within drive box 520 may also provide feedback of torch tilt angle as U-V coordinates to PC 1350 for comparison with the converted U-V coordinates from the conversion module 1356. Such comparisons may be real-time, and serve to monitor and/or adjust performance of bevel head 599.

Bevel head 599 may have a back plate 543 (also called a back panel herein) (see again FIG. 5) that attaches to gantry 1335 of cutting machine 1300. A Z-axis height adjusting mechanism 540 (shown as height adjustment control 833 in FIG. 8) may couple with back plate 543 via linear bearings 575 and support a drive box 520 that is included with bevel head 599. Bevel head 599 can move along the Z-axis by moving drive box 520 relative to back plate 543 (shown as element 901 in FIG. 9) using a motor driven lead screw 542. In an embodiment, back plate 543 can provide drive box 520 a clearance of as much as 270 mm.

Bevel head device 599 thus advantageously provides a torch lifter with independent tilt and swivel capability that attaches to a movable gantry 1335 of cutting machine 1300. Movable gantry 1335 can then be controlled from PC 1350, which in turn can be connected, via cables 1338, to a remote amplifier box 1337 that generates signals for controlling servo motors (e.g., motors 811, 821, 831) of gantry 1335 to provide X-Y movement of bevel head 599. That is, the X and Y movement of bevel head 599 is provided by gantry 1335, and is similar to X and Y movement of conventional cutting machine 100.

Bevel head 599, if formed as a single package, may contain amplifiers (i.e., element 870, FIG. 8) driving internal servo motors 811, 821, 831 for controlling height (Z), tilt, and rotation (derived from A and C) of torch 1325. Bevel head 599 can also be controlled by PC 1350 via a network cable 1352, for example. PC 1350 executes software 1354 for controlling and monitoring movement of torch 1325 by bevel head 599, and movement of gantry 1335 to perform cutting of plate 1360.

Bevel head 599 may be formed as a self-contained, PC peripheral device that cooperates, under control of software 1354, with gantry 1335 to provide five axis cutting of plate 1360. Although PC 1350 and remote amplifier box 1337, connected by cable 1336, are shown as separate components from gantry 1335, PC 1350 and amplifier box 1337 may alternatively be mounted to gantry 1335 to further reduce cabling. In an embodiment, bevel head 599 may fully replace torch holder 130 of cutting machine 100 to form cutting machine 1300. Use of bevel head 599 may therefore convert an existing XY cutting machine (e.g., cutting machine 100, FIG. 1) into an XYACZ cutting and weld preparation machine (e.g., cutting machine 1300).

It should be understood that, in an event where a mathematical singularity arises in converting U-V coordinates back to A-C coordinates, and where A is zero, C cannot be determined from the U-V coordinates. Therefore, in an embodiment, within PC 1350, software 1370 may alternatively utilize the U-V coordinates without converting back to A-C coordinates. According to this example, within PC 1350, servo feedback control can be based upon the determined U-V coordinates instead of the A-C coordinates conventionally used.

More specifically, conversion module 1356 may utilize at least one equation to convert from A-C coordinates into U-V coordinates, and need not rely upon conventional tables for this conversion. Conversion module 1356 may be based upon a geometry of bevel head 599, and can therefore be unique to bevel head 599. In an example of operation, where tilt of cutting torch 1325 varies continuously along an edge of a part being prepared, a controlling NC program provides continuous updates of A-C coordinates as corresponding X-Y coordinates change, and then software 1354 may utilize the conversion module 1356 to convert each A-C coordinate into a corresponding U-V coordinate.

Figure 10:
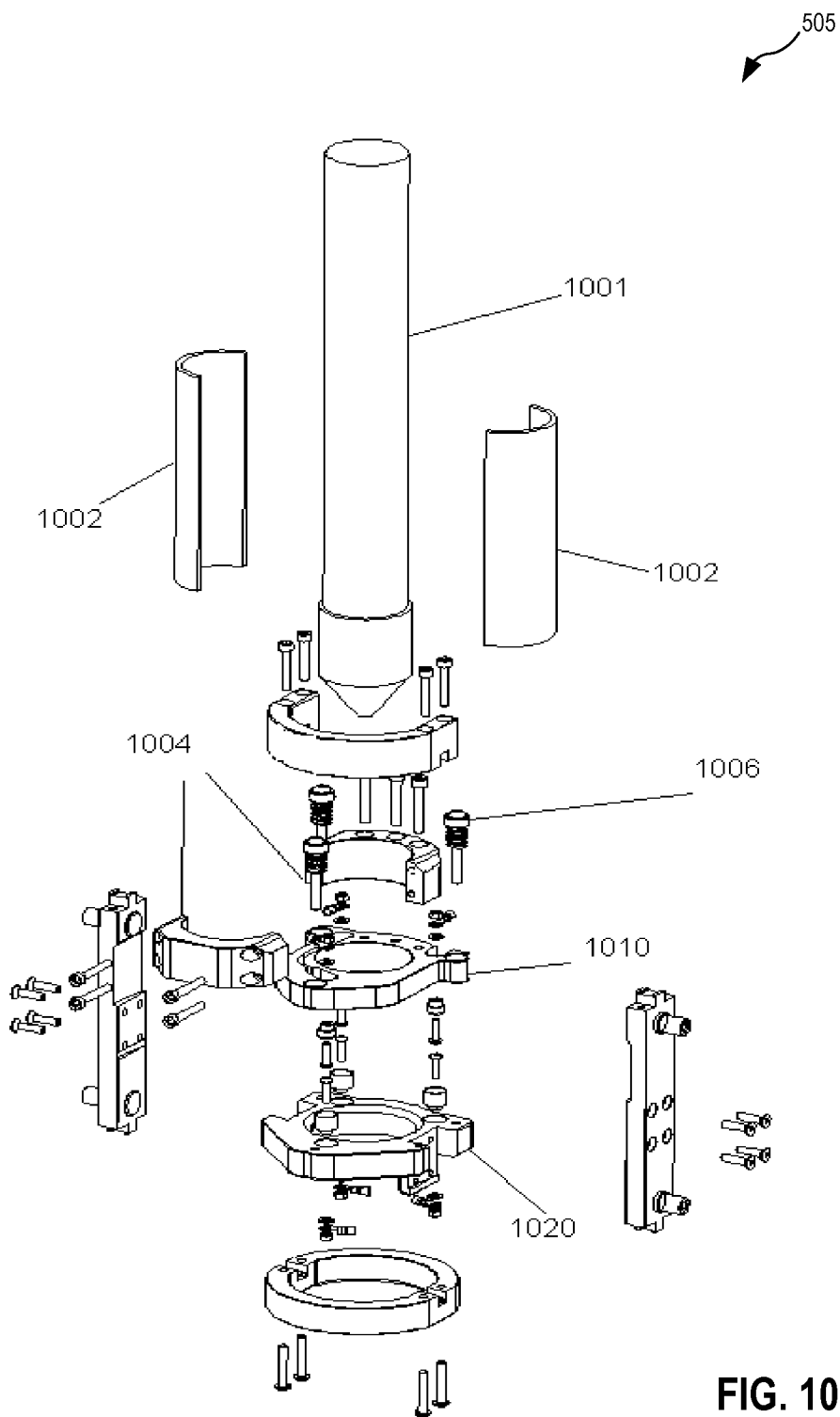
FIG. 10 shows exploded view of a breakaway torch holder of FIG. 5.
Figure 11:
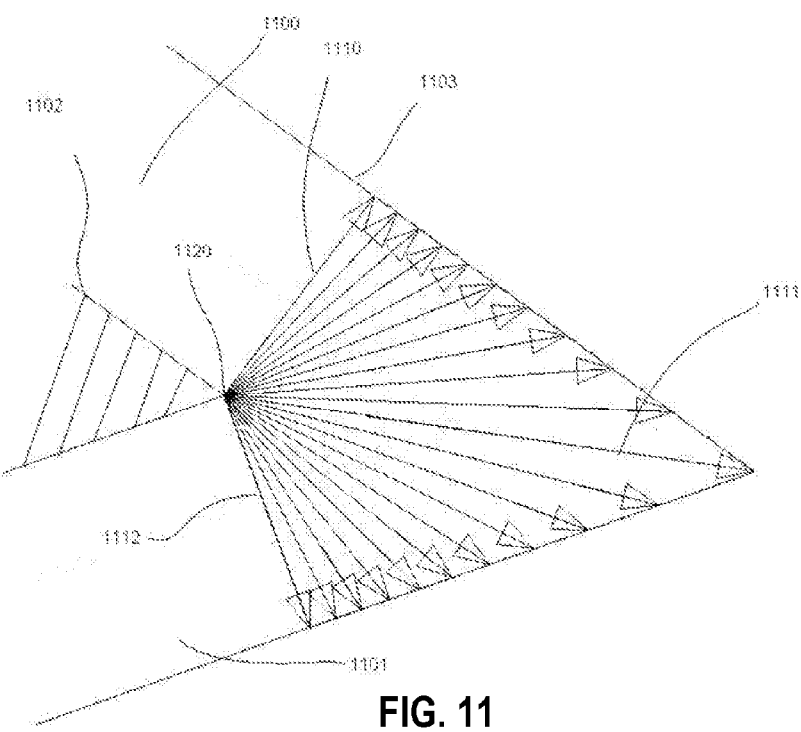
FIG. 11 shows preparations for a corner cut while cutting at a tilt angle.
Figure 12:
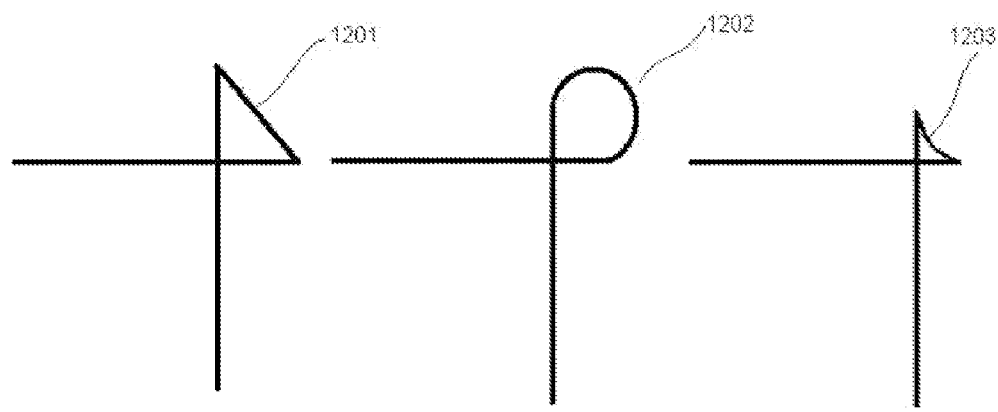
FIG. 12 shows three corner cuts utilizing a bevel head.

Unlike conventional plasma cutting machines (e.g., machine 100, FIG. 1), where the distance between a tip of the cutting torch and the plate (e.g., plate 160) is adjusted by raising or lowering the torch height control, the tilted torch design represented by machine 1300 may instead utilize laser 511 to correct a height of cutting torch 500. If the torch height is not corrected thereby, that is, the height is still outside a typical operating distance from the plate (6-14 mm, for example), according to the embodiment shown in FIG. 10, an operator may release or loosen a torch body 1001 in the torch holder 1010, and move the body 1001 a desired distance from the plate, and then retighten the body 1001 in the holder 1010. Additionally, laser 511 may be activated and deactivated by remote I/O (e.g., via RS232 plugs 553, 554) for additional safety, or only when desiring to adjust the torch height. In an embodiment, laser 511 is a low power class II laser.

To maintain a desired height of bevel head 599 over plate 560, a scan or survey of the plate surface may also be done before cutting begins, as described in U.S. Patent Publication No. 2009/0312862, which is incorporated by reference herein. A laser height control (not shown) located at position 523 of drive box 520 may therefore also be used in an embodiment to avoid unacceptable variations in height of bevel head 599 above plate 560.

Although conventional height measurements using arc voltage may not provide sufficient accuracy for accurate height measurement, as described above, in an embodiment, such voltage measurements may nevertheless also be fed back into PC 1354, converted to digital data, and used in combination with a height derived from the laser height control attached at point 523 to provide a hybrid feedback height control solution. This hybrid solution may allow bevel head 599 to further accurately and safely cut material that bends while being cut, for example, thin material, or material that is cut and not weld prepared. Because some laser-predictive height controls do not account for unexpected height changes (such as bending material) while cutting, incorporation of the arc voltage may provides an additional emergency mechanism for detecting unusual or dangerous conditions, thereby making bevel head 599 useful for cutting all types of materials, and not just materials requiring weld preparation. Furthermore, because the advantageous configuration of bevel head 599 significantly reduces weight of the apparatus as compared with conventional cutting torches, bevel head 599 is a useful replacement for all cutting torches known in the field.

Referring back to FIG. 6, pantograph 570 is shown with a cutting torch 610 that has a tip 611. Cutting torch 610 is, for example, a high definition plasma cutting torch, although other cutting devices maybe used without departing from the scope herein. Tip 611 is a distance 612 from a point 608 on surface 620 of plate 1360. Tilt angle 605 is consistent with the angle of tip 611 of the cutting torch 610. In an embodiment, tip 611 has an angle of, for example, 55 degrees, such that torch 610 can reach an angular design limit while maintaining a distance 612 (e.g., 8 mm) from the focal point 608. It should be understood that tip 611 may be formed to accommodate other angle design limit, e.g., 50 degrees, 58 degrees, etc. without departing from the scope herein. It should also be noted that in the example shown in FIG. 6, pantograph 570 is not fully closed. Pantograph 570 though, when fully closed, can provide cutting torch 610 with a tilt angle of 58.2 degrees or more.

As shown in FIG. 8, drive box 520 includes three motors 811, 821, 831 and two gearboxes 812, 822. Motors 811, 821, 831 may be, for example, three identical 400 watt digital motors, although it is possible to utilize higher or lower wattage amplifiers or to vary the wattage of the amplifiers from motor to motor depending on power requirements and optimizations.

In an embodiment, each gearbox 812, 822 may have a 60:1 ratio. Motors 811, 821, 831 may also each include digital encoders, such that the U-axis, V-axis, and Z-axis position of bevel head 599 may be immediately determined without requiring complex homing and registration of cutting machine 1300 (see FIG. 13), as required by conventional machines when power is first applied or later lost or interrupted. As described above, since bevel head 599 may use geared and thread drives, motors 811, 821, 831 do not necessarily require additional powered brakes. The mechanical leverage for movement of drive box 520 along the Z axis may be provided by a drive screw 832. A bearing 853 can then support a significant portion of the weight of primary arm 510, pantograph 570, cutting torch 500, and associated cables.

In an embodiment, box 520 has 240 volt input power and includes a small PC transformer 896, attached to a wall of box 520 by strap 895, to provide DC power to a distance measuring laser 860 (called a laser height control located at position 523 of drive box 520 in FIG. 5), I/O electronics mounted on a back wall (not shown), and logic for the amplifier 870. In this example, amplifier 870 can be digitally controlled and provide up to 5 amps of power to each of motors 811, 821, and 831. Amplifier 870 can be a single amplifier with subdivided power, individual amplifiers to each servo motor separately, or a combination thereof. In an embodiment, distance measuring laser 860 measures distance by parallax with a resolution of about 0.1 mm. Distance measuring laser 860 may communicate with the NC control via RS232 serial communications for mapping of the XYZ surface of the plate.

Fan and filters 880 may cool the interior of drive box 520 while keeping dirt, metal, and carbon particles out of the box. Drive box 520 may further include metal covers to shield against radiation, and also to close the Faraday cage. Wires, such as those that may exit the bottom of the assembly (not shown), may exit through small holes to minimize ingress of radiation. Each of motors 811, 821, and 831 can be mounted on high density nylon blocks (e.g., nylon blocks 813, 823) to dampen gear noise and prevent motor vibration being transmitted through an exoskeleton of the box 520. In an embodiment, motors 811, 821, 831 are connected to respective drive components by toothed belts that match the profiles of sprockets (not shown) used to drive the three axes U, V, and Z. Special tensioning cam devices 892 may also be provided to allow external tensioning, after assembly or shipping, of drive belts (not shown) in the motors by adjusting a base position of each motor base.

Figure 9:
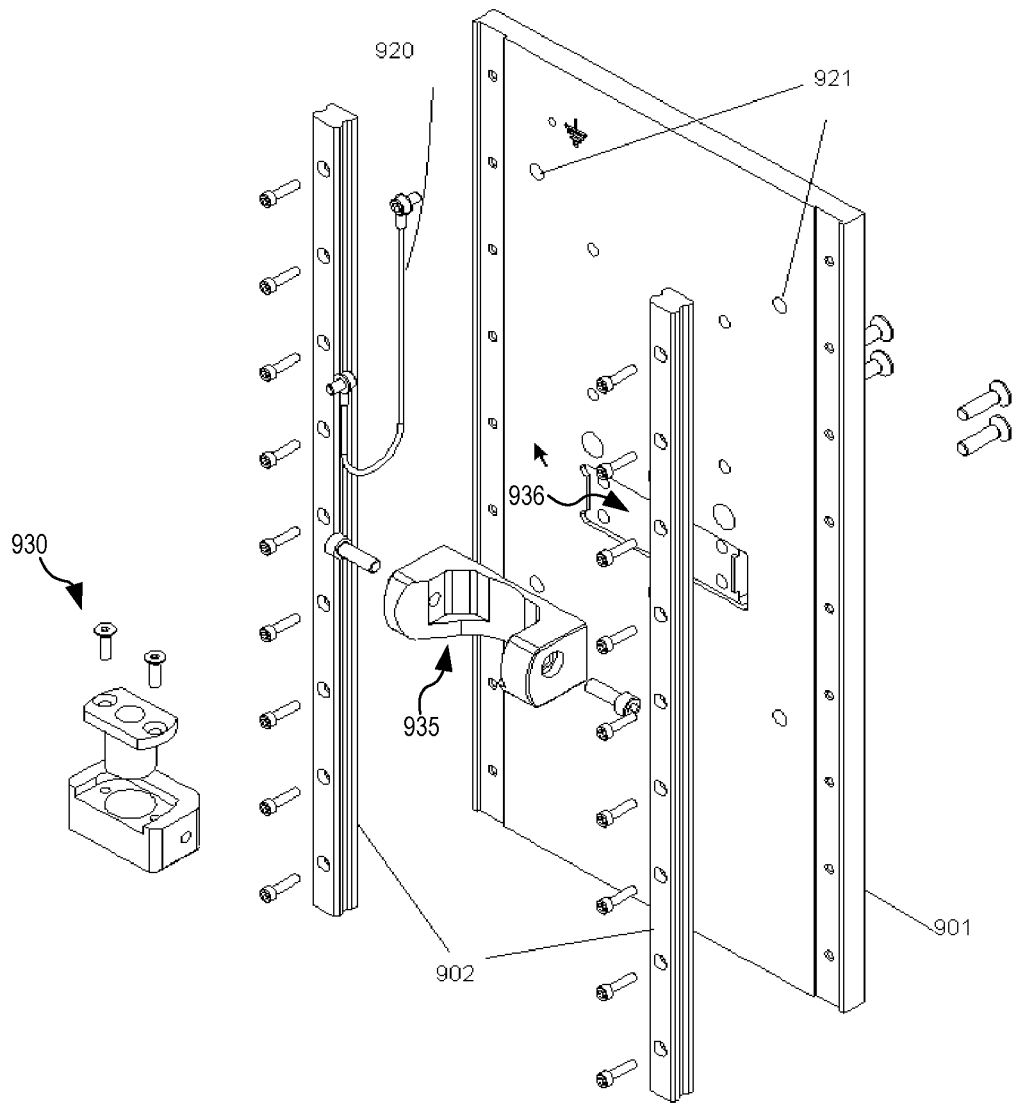
FIG. 9 shows an exploded view of an integrated back panel of FIG. 5.

FIG. 9 shows an example of a back plate assembly 901, which can be formed as a flat aluminum plate having four holes 921 for attachment to an NC machine. The assembly 901 is shown with two linear bearings 902 (similar to linear bearings 575, FIG. 5), a threaded drive assembly 930 for accepting rear drive screw 542, 832, a threaded drive assembly attachment device 935 for securing threaded drive assembly 930 onto back plate assembly 901 via assembly recess 936. Plate 901 thus represents a more detailed embodiment of plate 543 from FIG. 5. The drive box 520 (see again FIG. 5) can thus be lifted up and down against plate 901. In an embodiment, a ground wire 920 (shown as ground wire 541 in FIG. 5) grounds drive box 520 to back plate 901 and thereby to an ground of machine 1300 to provide the electronic protection from ground loops that can magnify substantial nearby radiation effects of high ground currents from a plasma cutting torch.

The self-lifting design of bevel head 599 thereby eliminates the need for traditional and expensive torch height controls (THC) that are prevalent in the field and required with conventional beveling torches. Bevel head 599 also advantageously places amplifiers and motors within a single drive box, thereby eliminating problems, described above that occur with separate motors, amplifiers, and electronics. Bevel head 599 thereby has reduced cost and complexity as well as a substantial saving in weight. This self-lift design and lighter weight allows bevel head 599 to be integrated with older, and often lighter-framed, optical-following and oxy-cutting machines, in addition to plasma cutting machines. This ability to retrofit lighter machines further also allows a more cost effective transition from a first cutting method (e.g., oxy-acetylene) to a second cutting method (e.g., plasma).

Referring again to FIG. 10, breakaway mechanism 505 is shown in detail. A torch holder 1010 includes two half shell pieces 1002 that clamp to a torch body 1001, which can be in turn inserted into breakaway mechanism 505, formed of clamps 1004 and torch holder 1010. When assembled, a connection between torch holder 1010 and torch holder 1020 may be completely mechanical or may be a simple contact connection, which will break during a collision, stopping the machine. Torch holder 1010 may be held onto torch holder 1020 by three spring loaded screws 1006, and the breakaway force for the mechanism 505 may then be set according to the spring tension of the screws. A collision of the torch, from any side direction or of the tip from below, may then reliably break the connection and stop the machine.

The present device and system creates a simple, affordable, compact, light, strong, safe, easy-to-use and very accurate device which would eliminate many of the problems which have beset the field, while also enabling the elimination of most hand grinding of plate steel.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A bevel head apparatus for adding tilt, rotation, and vertical positioning to a cutting torch of a numerically controlled flat plate cutting machine, comprising:
    a back panel attaching to the cutting machine;
    a drive box coupled with the back panel for housing electronics and mechanical components, the drive box having vertical movement relative to the back panel;
    an arm coupled to the drive box for providing rotational movement of the cutting torch; and
    a pantograph coupled with the arm for providing tilt movement to the cutting torch, wherein the cutting torch is attached to the pantograph;
    wherein the tilt, rotation, and vertical positioning of the cutting torch are controlled by the electronics and mechanical components.

2. The bevel head apparatus of claim 1, the back panel comprising a vertical screw mechanism coupled to a vertical motor of the mechanical components and the drive box, wherein rotation of the vertical screw by the vertical motor provides the vertical movement of the drive box, arm, pantograph, and cutting torch.

3. The bevel head apparatus of claim 1, wherein the arm is mechanically coupled to a rotation motor within the drive box that controls rotational movement of the arm, pantograph, and cutting torch, the arm containing (a) a drive shaft coupled to a tilt motor within the drive box, and (b) a gear box coupled to the drive shaft and the pantograph to control the tilt.

4. The bevel head apparatus of claim 1, the pantograph having two diagonally opposite parallelograms, a first of the parallelograms formed in part by the arm, and a second of the parallelograms couples to the cutting torch.

5. The bevel head apparatus of claim 1, further comprising a laser distance measure for determining a height of the cutting torch above the flat plate, wherein the height is maintained by the electronics and the vertical motor.

6. The bevel head apparatus of claim 1, the cutting machine providing x-axis and y-axis movement of the cutting torch.

7. The bevel head apparatus of claim 1, the electronics comprising a computing device and cutting software instructions that are executed by the computing device to control the tilt, rotation and vertical motion of the cutting torch in cooperation with the x-axis and y-axis motion of the cutting machine.

8. The bevel head apparatus of claim 7, the drive box comprising a Faraday Cage for protecting the electronics.

9. The bevel head apparatus of claim 1, further comprising external software for determining control statements that control the cutting machine and the bevel head apparatus such that the cutting torch follows a plurality of paths to cut out a piece with weld preparation from the flat plate.

10. A bevel head system having controls for controlling a tilt, rotation, and vertical movement of the bevel head, comprising:
    a drive box having electronics, a tilt motor, a rotation motor, and a vertical motor for controlling the tilt, rotation, and vertical movement, respectively;
    a pantograph supporting a torch holder;
    an arm supporting the pantograph, and connected to the rotation motor;
    a gearbox, disposed with the arm and connected to a tilt motor driven central shaft recessed with the arm, for converting the rotational movement of the central shaft to the tilt movement of the pantograph; and
    a vertical movement controller having a drive screw connected to the vertical motor.

11. The bevel head system of claim 10, further including a laser height controller in communication with the vertical movement controller for measuring a tip to plate distance.

12. The bevel head system of claim 10, wherein the drive box is at least partially milled from aircraft aluminum.

13. The bevel head system of claim 10, wherein the rotation movement and the tilt movement are at least partially coupled.

14. The bevel head system of claim 13, wherein the tilt movement controlling central shaft is rotated with the twist movement of the arm to avoid an unintentional tilt movement.

15. The bevel head system of claim 10, wherein the drive box is formed as a Faraday Cage to protect electrical components within the drive box.

16. The bevel head system of claim 10, wherein the pantograph is formed with two diagonally opposite parallelogram for maximizing the tilt movement described by a tilt angle.

17. The bevel head system of claim 16, wherein the tilt angle is greater the 55 degrees.

18. The bevel head system of claim 10, wherein the pantograph is formed with pantograph arms that are milled in 5 axes to maximize the tilt movement described by a tilt angle.

19. The bevel head system of claim 18, wherein the tilt angle is greater the 55 degrees.

20. The bevel head system of claim 10, further including a fixed mounting plate for securing the bevel head system to a Numerically Controlled (NC) cutting machine.

21. The bevel head system of claim 20, wherein the fixed mounting plate includes four attachment holes for attaching to the NC cutting machine.

22. The bevel head system of claim 20, wherein the NC cutting machine is controllable only along an X-axis and a Y-axis.

23. The bevel head system of claim 10, further including a breakaway unit to protect the device during a collision.

24. The bevel head system of claim 23, wherein the breakaway unit comprises a plurality of spring loaded screws, and the breakaway force is set by the tension of the springs within the spring loaded screws.

25. The bevel head system of claim 10, wherein the gearbox is a sealed gearbox to protect the gears from particulate matter.

26. The bevel head system of claim 10, wherein the torch holder accepts adapter sleeves to accommodate different sized cutting torches.

27. The bevel head system of claim 10, further comprising a connection for 220 volt power, a RJ45 connection for communicating with the electronics to control servo systems for the three axes, and at least one RS232 connection for outputting digital laser data.

\* \* \* \* \*

UNITED STATES PATENT AND TRADEMARK OFFICE
CERTIFICATE OF CORRECTION

PATENT NO. : 8,865,056 B2  
APPLICATION NO. : 13/427513  
DATED : October 21, 2014  
INVENTOR(S) : Matthew Fagan Page 1 of 1

It is certified that error appears in the above-identified patent and that said Letters Patent is hereby corrected as shown below:

On the title page, item 57 the Abstract, Line 12, "include" should read --includes--;
In the specification
Column 3, Line 12, "cable sand hoses" should read --cables and hoses--;
    Line 44, "results" should read --result--; Line 53, "removal" should read --removed--;
    Line 56, "cost to and" should read --cost and--;
Column 5, Line 14, "shows exploded" should read --shows an exploded--;
Column 9, Line 23, "provides" should read --provide--; Line 35, "maybe" should read
    --may be--; Line 43, "limit" should read --limits--;
Column 10, Line 65, "machines further also" should read --machines also--;
In the claims
Column 12, Lines 46 and 47, "parallelogram" should read --parallelograms--;
    Line 50, "greater the 55" should read --greater than 55--; Line 56, "greater the 55"
    should read --greater than 55--.

Signed and Sealed this
Tenth Day of November, 2015

Michelle K. Lee
*Director of the United States Patent and Trademark Office*